(12) United States Patent
Chao

(10) Patent No.: US 6,404,517 B1
(45) Date of Patent: Jun. 11, 2002

(54) COLOR-PATCH SHEET REGISTRATION

(75) Inventor: Dennis Lai Chao, Mountain View, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/053,168

(22) Filed: Mar. 31, 1998

(51) Int. Cl.⁷ .......................... H04N 1/46; G03G 15/00
(52) U.S. Cl. ........................... 358/504; 358/406; 399/9
(58) Field of Search ................ 358/401, 406, 358/448, 504, 296; 399/9; 382/112

(56) References Cited

U.S. PATENT DOCUMENTS

| | | |
|---|---|---|
| 4,300,791 A | 11/1981 | Bohrer et al. |
| 4,569,584 A | 2/1986 | St. John et al. |
| 4,571,699 A | 2/1986 | Herzog et al. |
| 4,965,597 A | 10/1990 | Ohigashi et al. |
| 5,004,896 A | 4/1991 | Serrell et al. |
| 5,184,003 A | 2/1993 | McMillin et al. |
| 5,185,661 A | 2/1993 | Ng |
| 5,416,613 A | 5/1995 | Rolleston et al. |
| 5,438,649 A | 8/1995 | Ruetz |
| 5,450,216 A | 9/1995 | Kasson |
| 5,452,112 A | 9/1995 | Wan et al. |
| 5,589,951 A | 12/1996 | Woydich |
| 5,664,076 A | 9/1997 | Pluta et al. |
| 5,760,913 A | 6/1998 | Falk ........................ 358/504 |
| 6,002,489 A | 12/1999 | Murai et al. ............. 358/406 |
| 6,275,600 B1 | 8/2001 | Banker et al. ........... 358/406 |

*Primary Examiner*—Kimberly A. Williams
(74) *Attorney, Agent, or Firm*—Mark P. Watson (57) ABSTRACT

A series of registration marks are printed on a color patch sheet or on a series of color patch sheets used for calibrating a color image reproduction system. These registration marks will be printed by a printer under control of an image processing unit and thereafter scanned by a scanner and interpreted by the image processing unit. For example, the registration marks may be small, black, rectangular blocks arranged at one or all of the top, bottom and sides of the page. These marks provide a variety of color patch information including the horizontal and vertical start and end points of the color patch array, the horizontal width and vertical height of the color patches, the page number of the color patch sheet and print mode of the printer when the color patches are printed, and an indication of the bottom of the color patch sheet.

46 Claims, 5 Drawing Sheets

COLOR-PATCH SHEET REGISTRATION

BACKGROUND OF THE INVENTION

1. Field of the Invention

The present invention relates generally to color image reproduction systems, and more particularly to systems that improve color matching between original color images and reproductions of those images.

2. Description of the Related Art

Color image reproduction systems typically include an input device for providing a representation of an original image, an output device for generating a replica of the image, and a controlling device that processes signals received from the input device to generate new signals sent to the output device to produce the replica, which preferably is a high-fidelity reproduction of the original image. The controlling device may be implemented by a general-purpose computer with appropriate software and/or hardware for peripheral control and signal processing or may be a dedicated image processing unit associated with a particular input device/output device pair. Examples of an input device include hand held, flatbed and sheet-fed optical scanners, digital and video cameras, and software applications. In other words, an original image may be sensed or it may be created by a process. Examples of an output device include ink jet, laser, and photolithography printers, electrostatic, flatbed and drum plotters, and video displays such as cathode ray tubes, thin-film-transistor and liquid crystal display panels.

Generally, input and output devices use a device-dependent or device-specific color space or coordinate system to specify colors. These coordinate systems map the color coordinates to the color-sensing or color-generating process of the particular device. The term "color space" refers to an N-dimensional space in which each point corresponds to a particular color.

One example of a three-dimensional color space is an RGB space in which point coordinates specify particular amounts of additive primaries red (R), green (G) and blue (B), represented by the three axes of the cube. All other colors within the cube can be represented by the R, G, B triplet, where the values for R, G, and B fall within a range from minimum intensity (e.g. 0) to maximum intensity (e.g. 1). White is represented when all three primaries are added at their maximum intensity (1,1,1) and black is represented by the complete absence (0,0,0) of all three primaries. Shades of gray are represented along the diagonal of the cube connecting the black and white coordinates. In an additive system light emitters are controlled to obtain color. The operation of many scanners and color display devices may be conveniently controlled by signals that are specified in RGB space. Another example of a three-dimensional color space is a CMY color space in which point coordinates specify particular amounts of subtractive primaries cyan (C), magenta (M), and yellow (Y) which combine to represent a specific color. In a subtractive system light is absorbed rather than emitted. Typically used in printing, the subtractive colors are printed on a white surface (e.g. paper) and the inks selectively absorb certain ranges of wavelengths of light and the remaining spectral radiant power is reflected. The subtractive system is the complement of the additive system and ideally the mixture of two additive primaries produces a subtractive primary. For example, the mixture of red and green is yellow. Similarly the mixture of two subtractive primaries produces a additive primary. When cyan and magenta are mixed, the cyan absorbs the red wavelengths of the magenta and the magenta absorbs the green wavelengths of the cyan, leaving only blue. Since complete absorption is difficult to achieve in printing inks, a fourth ink, black, is used as well in many devices. This system is specified as CMYK with the K representing black. The operation of many ink jet and laser printers may be conveniently controlled by signals that are specified in CMYK space or CMY space. Other color spaces that are related to particular devices are also known.

Most devices are capable of sensing or reproducing only a portion of the full range of colors that can be discerned by a human observer. A device "gamut" refers to the range of colors that can be sensed or reproduced by a particular device. For example, the gamut of a particular scanner refers to the range of colors that can be sensed by that scanner and the gamut of a particular printer refers to the range of colors that can be reproduced or printed by that printer.

A scanner gamut is determined by a variety of factors including the spectral response of the optical sensors, the spectral characteristics of color filters, spectral characteristics of the illumination source and the resolution and linearity of analogto-digital converters.

A printer gamut is determined by a variety of factors including spectral characteristics of colorants such as ink, spectral and porosity characteristics of media such as paper, resolution or dots-per-inch of the printed image, and halftoning methods applied.

A video display gamut is determined by a variety of factors including spectral characteristics of the light emitting material, type of display device, resolution of pixels or video lines, and excitation voltage.

Although it is possible in principle to construct a color image reproduction system by merely connecting an output device directly to an input device, the results generally would not be satisfactory because the device-dependent coordinate systems and color spaces for the input and output devices are generally not the same. Even if the two sets of coordinate systems and color spaces are the same, the fidelity of the reproduced image as compared to an original image would probably be very poor because the gamut of the input device generally is not coextensive with the gamut of the output device. Values representing "out-of-gamut" colors that are not in the output device gamut cannot be reproduced exactly. Instead, some "in-gamut" color that is in the gamut of the output device must be substituted for each out-of-gamut color.

Color image reproduction systems can achieve high-fidelity reproductions of original images by applying one or more transformations or mapping functions to convert point coordinates in one color space into appropriate point coordinates in another color space. These transformations may be conveniently performed by the controlling device. In particular, with respect to the output device gamut, transformations are used to convert values representing in-gamut and out-of-gamut colors in an input device-dependent color space into values representing in-gamut colors in an output device-dependent color space. The mapping of in-gamut colors and out-of-gamut colors is discussed separately.

Mapping In-Gamut Colors

The transformation of output device in-gamut colors for many devices are non-linear and cannot be easily expressed in some analytical or closed form; therefore, practical considerations make accurate implementations difficult to achieve. Many known methods implement these transformations as an interpolation of entries in a look-up table (LUT) derived by a process that essentially inverts relationships between measured responses to known input values. For example, a transformation for an input device may be derived by using a medium conveying patches of known color values in some device-independent color space such as the Commission International de L'Eclairage (CIE) 1931 XYZ space, scanning the medium with the input device to generate a set of corresponding values in some input device-dependent color space such as RGB color space, and constructing an input LUT comprising table entries that associate the known color XYZ values with the scanned RGB values. In subsequent scans of other images, scanned RGB values can be converted into device-independent XYZ values by finding entries in the input LUT having RGB values that are close to the scanned values and then interpolating between the associated XYZ values in those table entries. Various interpolation techniques such as trilinear, prism, pyramidal and tetrahedral interpolation may be used.

Similarly, a transformation for an output device may be derived by producing a medium with color patches in response to color values selected from some output device-dependent color space such as CMYK color space, determining the color value of the patches in a device-independent color space such as CIE XYZ space by measuring the patches using a spectral photometer, and constructing an output LUT comprising table entries that associate the measured color XYZ values with the corresponding CMYK values. In subsequent output operations, XYZ color values can be converted into device-dependent CMYK values by finding entries in the output LUT having XYZ values that are close to the desired values and then interpolating between associated CMYK values in those table entries. Various interpolations such as those mentioned above may be used.

In operation, a color image reproduction system scans an original image to obtained color values in an input device-dependent color space, transforms the scanned values into a device-independent color space, transforms these device-independent values from the device-independent color space into an output device-dependent color space and in response, generates a replica of the original image. As mentioned above, the transformations described thus far apply only to output device in-gamut colors.

Mapping Out-of-Gamut Colors

By definition, output device out-of-gamut colors cannot be reproduced exactly. Instead, high-quality color image reproduction systems use transforms or mapping functions that substitute an in-gamut color for each out-of-gamut color. Preferably, these transforms attempt to minimize the perceptible difference between each out-of-gamut color and the corresponding substitute in-gamut color. Techniques for transforming out-of-gamut colors into in-gamut colors generally map the out-of-gamut colors to the boundary of the output device gamut or compress a region of color space so that all desired colors are mapped into the output device gamut.

The process of deriving such a transform and generating the lookup table is called system color calibration. If the transform is derived for a particular scanner-printer combination, the system is referred to as a closed system and the process is called closed system color calibration, which is a special case of system color calibration.

Usually the color image reproduction system is calibrated in the factory and the transform for a particular scanner model and printer model is stored in a LUT. Once the system is in the field, however, the performance of the components may change over time, or there may be variations in performance from one printer to another even though they are the same model, or the properties of the print media may change. As a result, the system may need to be re-calibrated in the field.

When the system requires re-calibration, the printer is controlled to print out a pattern of color patches. This pattern is then scanned back into the system by the scanner. This is performed on site by a system operator. The pattern of color patches is usually an array of color blocks of various colors printed on a particular media. When this color patch sheet is placed on the platen of the scanner, several alignment problems may arise. The paper may be skewed or placed up-side down, for example. Also, if certain color patches are very light or white, the scanner may interpret such patch as the end of the array of color patches.

OBJECTS OF THE INVENTION

It is an object of the present invention to overcome the problems of media alignment and misidentification of color patches on a color patch sheet.

Another object of the invention is to improve the identification of color patch sheets used in a closed loop calibration system.

A further object of the invention is to provide specific identification marks on the color patch media to indicate pertinent information such as the media page number, dimensions of the color patch array, color patch size, etc.

SUMMARY OF THE INVENTION

The present invention addresses the problems of the prior art by providing a series of registration marks on the color patch sheet. These registration marks will be printed by the printer under control of the image processing unit and thereafter identified by a scanner under control of the image processing unit. For example, the registration marks may be small, black, rectangular blocks arranged at one or all of the top, bottom and sides of the page.

In a preferred embodiment the first mark at the top of the page represents the starting edge of the first color patch. The second mark is placed above the center or some pre-defined position of the first patch. From these two marks the width of the patches on the sheet can be calculated. The second mark can be placed at any selected position of the first mark, e.g. one-quarter or three-quarters width, as long as the total width of the patch can be calculated from the first and second marks. The next two marks are insurance marks that must follow the width marks (i.e. the first and second marks) in order for the image processing unit to recognize the width marks as legitimate (in contrast to stray marks on the page). The next mark can be one of a plurality of reserved marks that can be put to an assigned use such as the number of the sheet where the total of color patches being scanned comprise several sheets and or a print mode or print media identifier. The last two marks are end-width marks separated by the same distance as the first two width marks and that signal the end of the row of patches. This series of marks thereby provides the image processing unit with valuable information about the format of the color patch sheet being scanned, including the start, end and width of the patches. This prevents misinterpretation of color data on the sheet.

The location of the marks also provides information about the position of the color-patch sheet on the platen. Once the image processing unit finds each of the marks, it can determine the position of the sheet by the coordinates of the marks and correct for any skew using standard techniques such as bilinear transformation. The series of marks can be replicated at the side of the page to provide the information about the color patch array in the vertical direction, i.e. start, end and width of the patches in the vertical or longitudinal direction. Also, a series of marks are provided at the bottom of the page, which, because of their assigned pattern and spacing identify the location of the page bottom. This can signal the image processing unit that the sheet has been placed up-side down on the platen if this series of marks is encountered in the first horizontal scan.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts

DESCRIPTION OF THE PREFERRED EMBODIMENTS

Figure 1A:
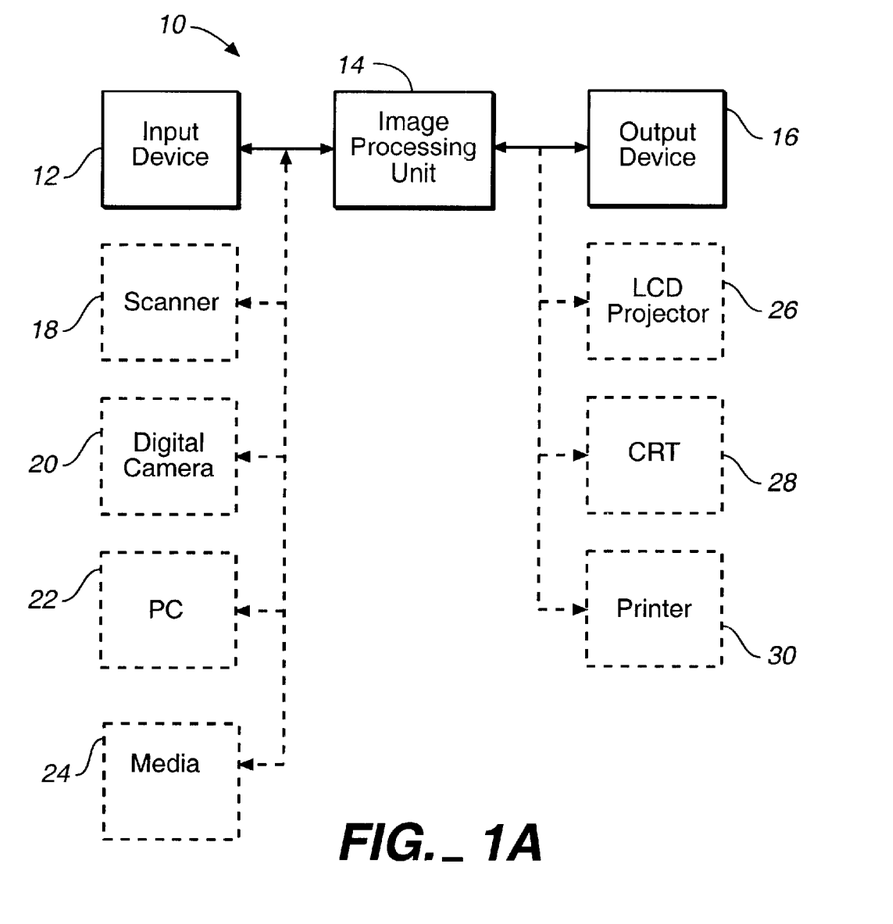
FIGS. 1A, 1B and 1C are block diagram representations of various general configurations of the environment of the present invention.
Figure 1B:
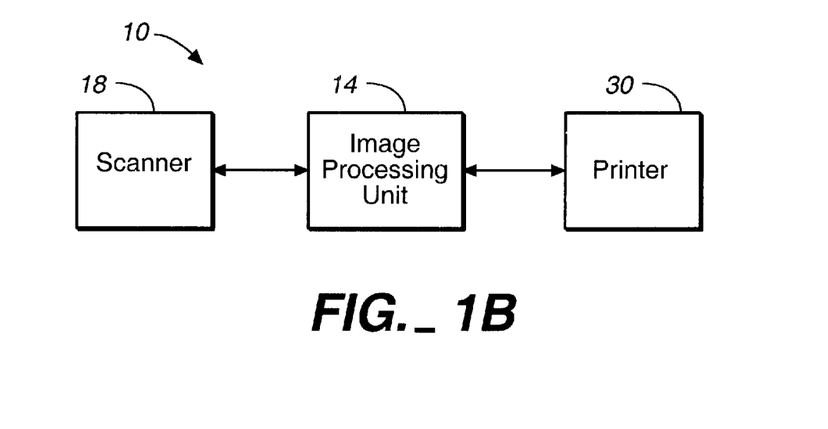
Figure 1C:
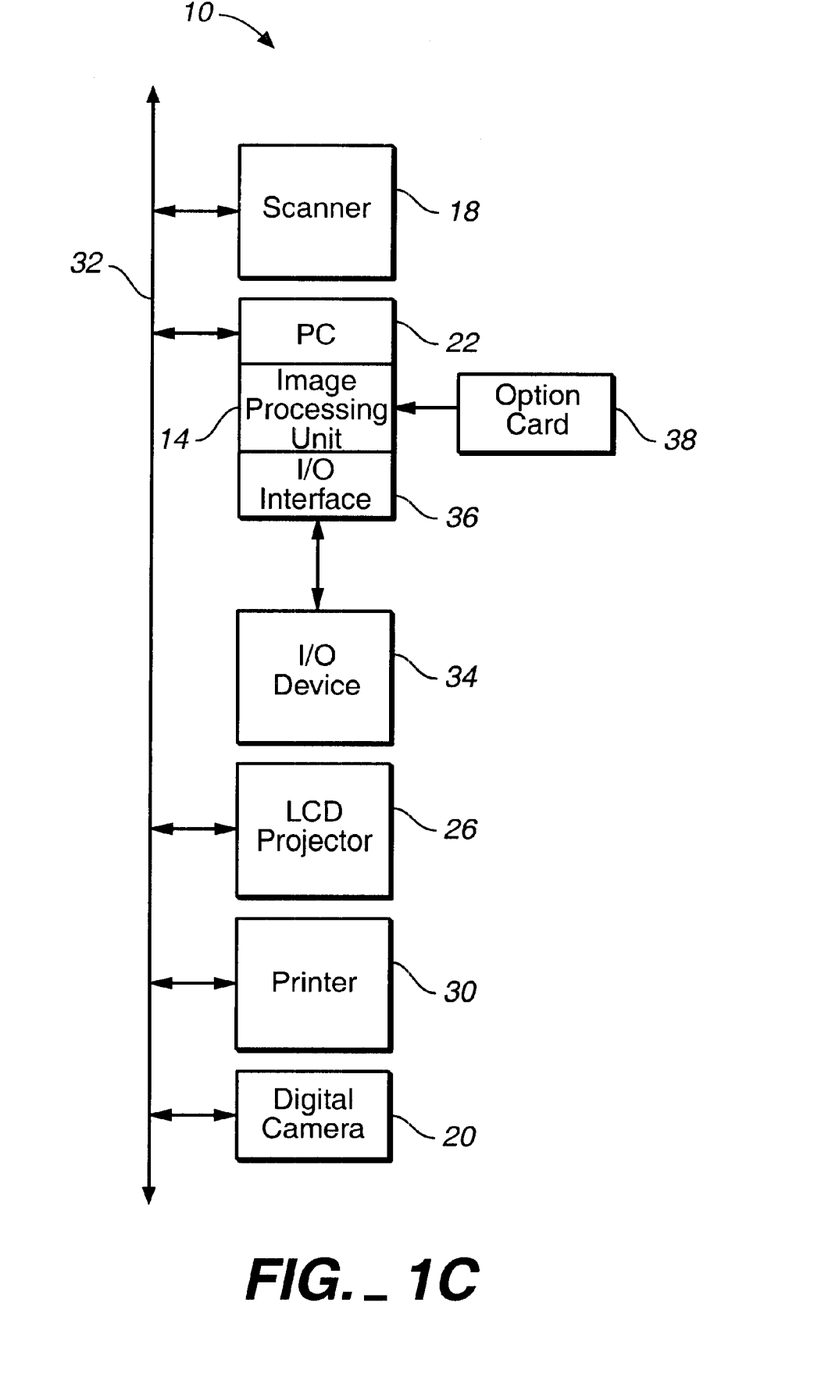

Reference is now made to FIGS. 1A, 1B and 1C which show the general configuration of an image handling unit 10. As shown in FIG. 1A, imaging handling unit 10 has three major components, an input device 12 for providing a source image, an image processing unit 14 for processing the source image and an output device 16 for displaying or printing the processed image. The input device 12 can take various forms such as a scanner 18, digital camera 20, personal computer (PC) 22 or media 24 (e.g. hard disk or diskette, floppy disc, optical disc). The output device 16 can also take various forms such as an LCD projector 26, CRT 28 or printer 30.

The image processing unit 14 may be implemented in hardware with discrete components, software, firmware, application specific integrated circuits (ASICs), or any combination thereof. Also, the functional blocks of the image processing unit are divided in this specification for convenience of description only. The functional and physical boundaries of these blocks will vary from device to device. For example, FIG. 1B shows the image processing unit 14 interfacing printer 30 with the scanner 18. Portions of the image processing unit may be associated functionally more with the scanner 18 than with the printer 30 or vice versa. FIG. 1C shows an embodiment of an image handling unit 10 with the image processing unit 14 formed as part of a personal computer (PC) 22 which may control operation of and communication between the image processing unit 14, LCD projector 26, scanner 18, printer 30, and control of and communication with peripheral equipment such as I/O device 34, each connected directly or indirectly to a PC Bus 32. In this embodiment, a source image may be have been previously stored (and perhaps enhanced through processing) in an I/O device 34 and can be loaded into the PC through I/O interface 36, or the image may be captured with a digital image input device such as a digital camera 20. In addition, the image processing unit 14, in the form of software, may be loaded into the PC's memory from an external storage device, i.e. I/O device 34. Alternately, the image processing unit in the form of hardware, ASIC, firmware, etc. or combination thereof can be embodied on an option card 38 that can be inserted into an available PC card slot.

Figure 2:
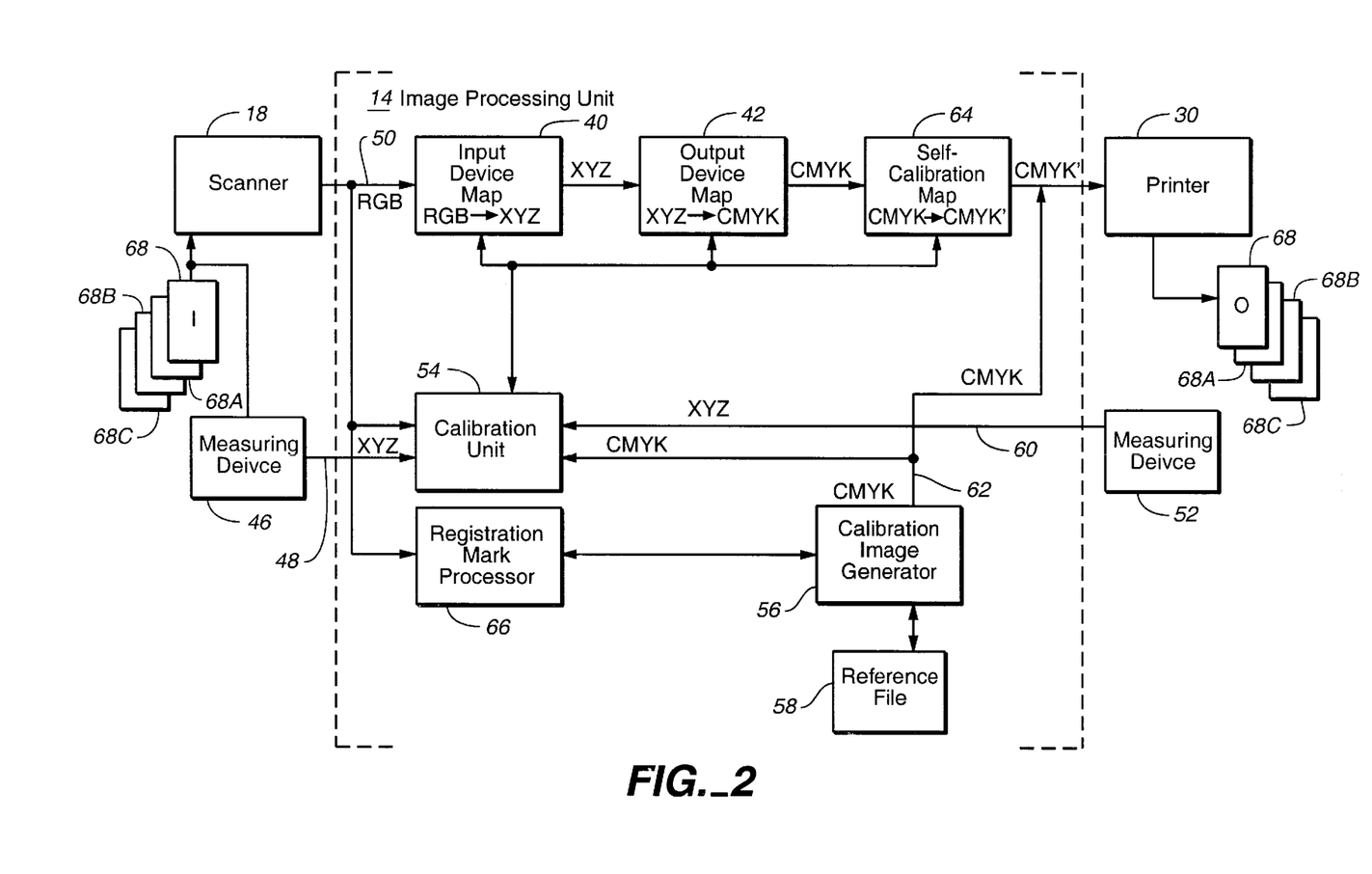
FIG. 2 is a schematic block diagram of a portion of the major functional components of the present invention.

While the present invention is applicable to any such device having these basic components, for the sake of illustration only the invention will be described in the environment of a particular image processing unit 14 associated with scanner 18 and printer 30 as shown in FIG. 2. Image processing unit 14 is shown as a separate block in FIG. 2 for convenience of description only, but in practice image processing unit 14 may be comprised in whole or in part in other system components such as scanner 18, printer 30 and/or personal computer 22, as examples.

Derivation of Input and Output Maps

FIG. 2 illustrates major components for deriving input-device map 40 and output-device map 42, which together transform an image in an input-device dependent color space into an image in an output-device dependent color space. The following is merely an example to illustrate the basic principles; however, these maps or transformations may be derived in a number of other ways, as is well known in the art. Maps or transforms 40 and 42 may be implemented as look-up-tables (LUTs) stored in a memory such as a random access memory (RAM). It will be assumed that these maps are generated at the factory using a representative scanner of the scanner model type and series being calibrated and a representative printer of the printer model type and series being calibrated Referring to FIG. 2, input-device map 40 may be derived by scanning an image I that has known color characteristics. For example, image I may be one or more sheets of paper with a plurality of areas or "patches" of color. Since the initial calibration is performed in the factory, these color patch sheets may be generated by a very high quality printer with a large color gamut or by a number of lower quality printers, each having a different gamut. The color characteristics of these patches may be determined by measuring device 46 such as a spectral photometer, high accuracy densitometer or calorimeter. Measuring device 46 scans image I and generates signals along path 48 representing the colors of the patches in a device independent color space such as the Commission International de L'Eclairage (CIE) 1931 XYZ space, referred to herein as CIE XYZ space. Scanner 18 scans image I and generates signals along path 50 representing the colors of the patches in an input device dependent color space such as scanner RGB space.

The device-independent and the device-dependent representations generated along paths 48 and 50, respectively, provide selected points in the two color spaces that define a forward function $f_I$ representing the way in which the input device (e.g. scanner 18) converts colors into a device-dependent representation. In response to these signals, calibration unit 54 derives an inverse function $f_I^{-1}$ from the device-dependent to the device-independent color spaces. For example, if measuring device 46 generates values in CIE XYZ space and scanner 18 generates signals in RGB space, then the forward function may be denoted as $f_I$: XYZ→RGB and the inverse function may be denoted as $f_I^{-1}$: RGB→XYZ.

Output-device map 42 may be derived by using printer 30 to generate image O and determining the color characteristics of image O. For example, image O may be one or more sheets of paper with patches that are analyzed by measuring device 52 such as a spectral photometer or colorimeter. Measuring devices 46 and 52 are shown separately for convenience but may be the same device. Image O is generated by calibration image generator 56 which applies the image from a reference file 58 to printer 30. Measuring device 52 scans image O and generates signals along path 60 representing the colors of the patches in a device independent color space such as CIE XYZ or CIE L*a*b* space. Calibration image generator 54 generates signals along path 62 representing the patches in a output-device dependent color space such as printer CMYK space.

The device-independent and the device-dependent representations generated along paths 60 and 62, respectively, provide selected points in the two color spaces that define a forward function $f_O$ representing the way in which the output device (e.g. printer) 30 converts the device-dependent representation into colors. In response to these signals, calibration unit 54 derives an inverse function $f_O^{-1}$ from the device-independent to the device-dependent color spaces. For example, if measuring device 52 generates values in CIE XYZ space and printer 30 generates the image in response to signals in CMYK space, then the forward function may be denoted as $f_O$: CMYK→XYZ and the inverse function may be denoted as $f_O^{-1}$: XYZ→CMYK.

Although the color reproduction system may be set up to perform well in the factory, the performance in the field may change due to differences in individual performance characteristics between printers (or scanners) even of the same make and model. Also, performance characteristics may change due to drift in components, operating a device in a new mode or changing the print media. Printers, for example, can be selected to operate in different modes to change the graphic quality, text mode, resolution, etc. Various approaches for self-calibration of color reproduction systems in the field are known. One approach is represented generally in FIG. 2. When the system requires self-calibration, calibration image generator 56 generates a number of test patterns from reference file 58 that are printed by printer 30 on one or more sheets of media. These test patterns are generally blocks or patches of color distributed in an array and distributed throughout the color space. The test patterns are then scanned by scanner 18. Calibration unit 54 compares the patterns that were directed to be printed with the patterns that were scanned in and produces a self-calibration map 64 that corrects or adjusts the original transform (i.e. the combination of input and output maps 40 and 42). Although this is a simplification of the transformation and self-calibration process, it is sufficient for an understanding of the present invention.

Since the self-calibration is being performed in the field, the person performing the self-calibration may introduce a number of errors. For example, when scanning in the test patterns, it may be important in the self-calibration process to identify certain aspects of the patterns which may be obscured by the operator. For example, the operator may scan the color patch sheets in a different order than they were printed, may place one or more sheets up-side-down, or may place the sheets on the scanner platen in a skewed position. In addition, the calibration unit 54, when reading in the color signals from the scanner, may encounter very light color patches that may be interpreted as the border area of the color patch page.

Figure 3:
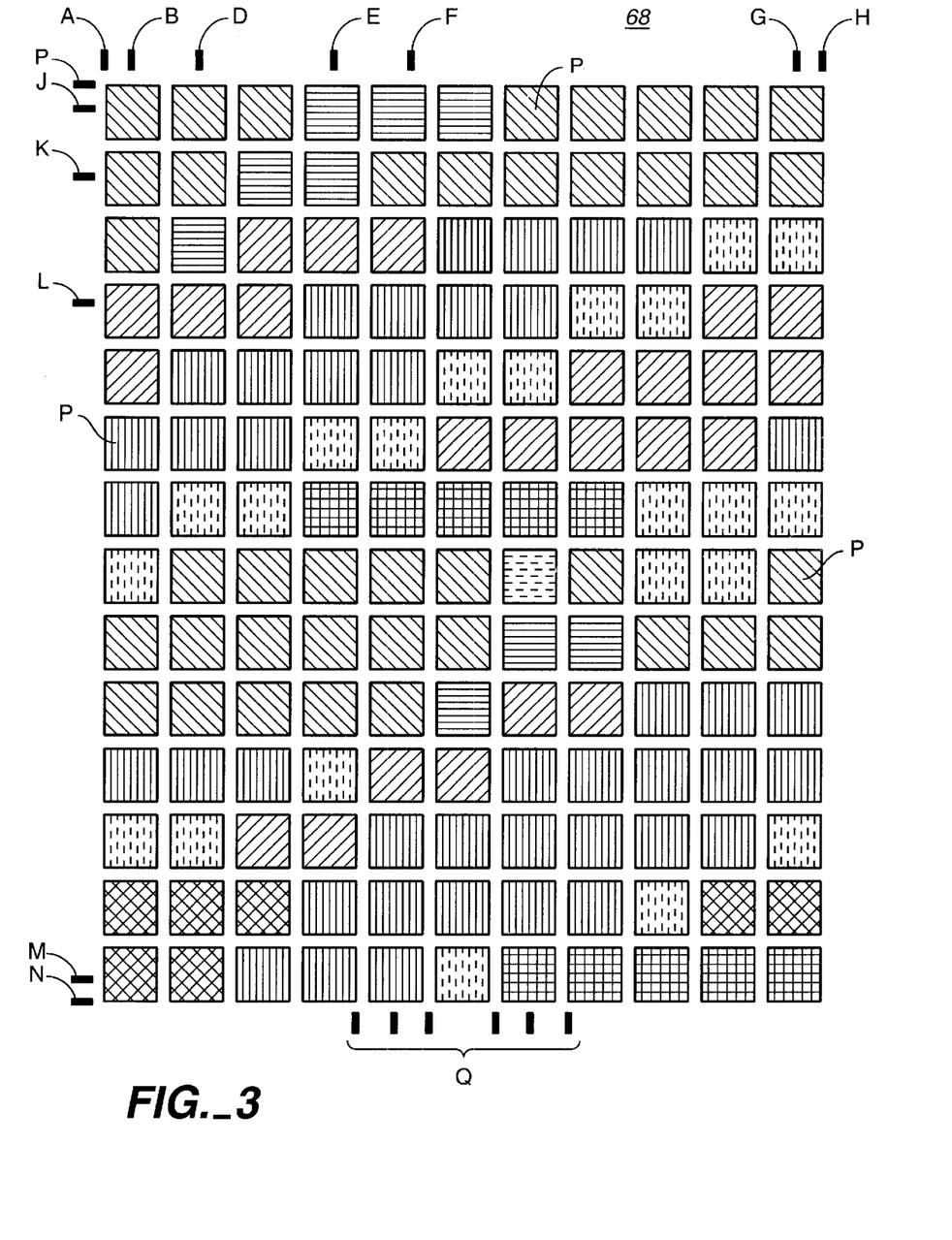
FIG. 3 shows an exemplary color-patch sheet of the present invention.

The present invention addresses these and other potential problems. The calibration image generator 56 of the present invention controls printer 30 to print a variety of registration marks on each color patch sheet. FIG. 3 illustrates an exemplary embodiment of a color patch sheet 68 produced by the present invention. In the self-calibration process, sheet 68 will be printed by printer 30 as output image O and scanned by scanner 18 as input image I (FIG. 2). Color patch sheet 68 will be one of a plurality of sheets 68A, 68B, 68C, etc. printed and scanned during self calibration. Sheet 68, shown in FIG. 3, may be any suitable media such as photo quality paper with a matte finish, coated, glossy or plain paper. Sheet 68 comprises an array of color patches P generated from various combinations of printer colorants, each one of which is separated from the others by white (typically) spacing. In addition to the color patches, calibration image generator controls printer 30 to print a variety of registration marks. Each of these marks will be of distinct size and shape different from the color patches P and may be, for example, small, solid black rectangles.

With reference to FIG. 3, in a preferred embodiment the first mark A at the top-left of the page represents the starting edge of the first color patch. The second mark B is placed at the center, for example, of the first patch. From these two marks the width of the patches on the sheet can be calculated by registration mark processor 66. Registration mark processor 66 is responsive to data from scanner 18 on path 50 for recognizing the registration marks as particular patterns, i.e. certain run lengths of black separated by certain run lengths of white. Methods for pattern, character and mark recognition are well known in the art and a detailed explanation is not necessary for an understanding of the present invention. The second mark B can be placed at any selected position of the first patch, e.g. one-quarter or three-quarters width, as long as the total width of the mark can be calculated from the first and second marks. The next two marks D and E are insurance marks that must follow the width marks (i.e. the first and second marks) in order for the registration mark processor 66 to recognize the width marks as legitimate (in contrast to stray marks on the page). The next mark F can be one of a plurality of reserved marks that can be put to an assigned use such as the number of the sheet where the total of color patches being scanned comprise several sheets. Mark F can also denote the printer mode or media type. The last two marks G and H are end-width marks separated by the same distance as the first two width marks A and B and that signal the end of the row of patches. This series of marks thereby provides the image processing unit 14 with important information about the format of the color patch sheet being scanned, including the start, end and width of the patches. The registration mark processor 66 controls the calibration unit to calibrate incoming pixel data as color patch data since processor 66 can calculate from the registration marks, the start, end and width of the patches. This prevents misinterpretation of color data on the sheet.

The location of the marks also provides information about the position of the color-patch sheet on the platen. Once the registration mark processor 66 finds each of the marks, it can determine the position of the sheet by the coordinates of the marks and correct for any skew using standard techniques such as bilinear transformation. The series of marks can be replicated at the side of the page to provide the information about the color patch array in the vertical direction, i.e. start, end and width of the patches in the vertical or longitudinal direction. As shown in FIG. 3, mark P represents the starting edge of the first patch in the vertical or longitudinal direction. Mark J is the width mark that, along with P, indicates the width of each patch in the vertical direction. Marks K and L are insurance marks and marks M and N represent the end width marks. Also, a series of marks Q are provided at the bottom of the page, which, because of their assigned pattern and spacing identify the location of the page bottom. This can signal the image processing unit 14 that the sheet has been placed up-side down on the platen if this series of marks is encountered in the first horizontal scan.

Thus the series of registration marks on color-patch sheet 66 printed under control of calibration image generator 56 and detected by registration mark processor 66 enables image processing unit 14 to correctly recognize color patches for calibration by calibration unit 54.

Figure 4:
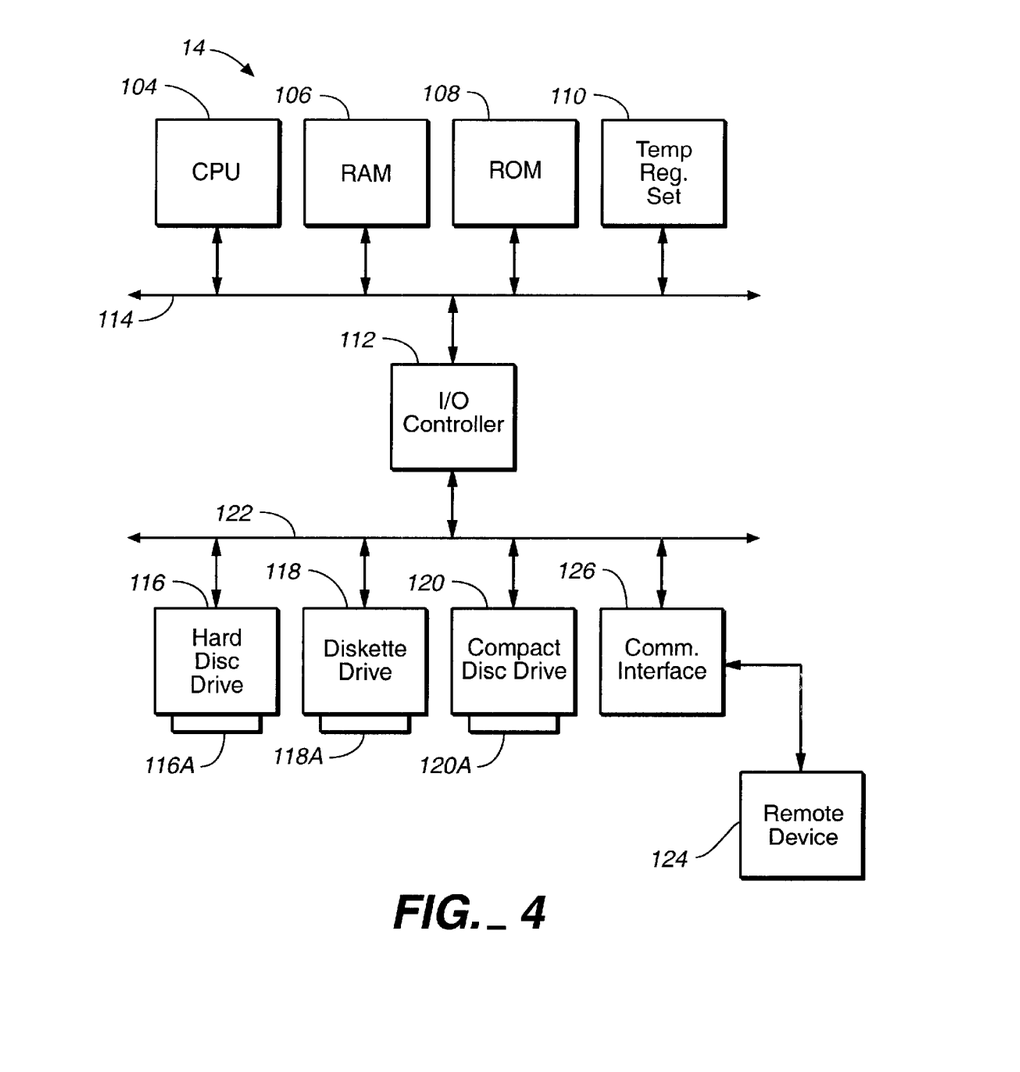
FIG. 4 is a schematic block diagram of another portion of the major functional components of the present invention.

While in the foregoing example the image processing unit 14 is described in terms of various functional units, image processing unit 14 may also comprise parts of other system components such as personal computer 22. As shown in FIG. 4, it may further include, for example, a central processing unit (CPU) 104, memories including a random-access-memory HAM 106, read-only memory (ROM) 108 and temporary register set 110, and an input/output controller 112, all connected to an internal bus 114. Although for the sake of illustration each of the above units are shown separately, these functional units may form part or all of the various functional units previously described such as calibration unit 54, registration mark processor 66, calibration image generator 56, input device map 40, etc. Further, depending on the nature of the system, e.g. a scanner and printer as part of a centrally controlled network, the functional units may be part of a general purpose computer programmed to control the scanning and printing functions. Additionally, it will be appreciated that these functional units may be implemented with discrete components, application specific integrated circuits, processors executing appropriate software and the like or any combination thereof.

Operating system software and/or application specific software for operating the scanner 18, printer 30 and/or the image processing unit 14 and/or the various functional units described herein may be stored in any combination of the memories 106, 108 and 110 or may be stored externally in one or more of the I/O units including hard disc drive unit 116, diskette drive unit 118, and compact disc drive 120, each connected to I/O Bus 122. Software for operating the various functional units and/or for implementing the method of the present invention may be stored on a medium such as hard disc 116A, diskette 118A or compact disc 120A, or may be stored at a remote device 124 and input through communications interface 126.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An apparatus for calibrating a color image reproduction system comprising:
   a calibration image generator for controlling printing of a plurality of color patches of various colors on a medium and a plurality of registration marks on said medium, said registration marks providing color patch information;
   a registration mark processor for receiving image data representing said printed registration marks and for interpreting said color patch information;
   a calibration unit for receiving image data representing said color patches and for calibrating said color image reproduction system in response thereto; and wherein said calibration image generator controls printing of a start mark designating a start of a color patch region on said medium.

2. An apparatus as in claim 1 wherein said calibration image generator controls printing of a horizontal start mark designating a start of a color patch region on said medium.

3. An apparatus as in claim 2 wherein said calibration image generator controls printing of a first horizontal dimension mark positioned a first distance from said horizontal start mark, said first distance equaling a portion of a width of each of said color patches.

4. An apparatus as in claim 3 wherein said calibration image generator controls printing of at least one horizontal check mark positioned a fixed distance from said horizontal start mark for verifying the authenticity of said horizontal start and dimension marks.

5. An apparatus as in claim 3 wherein said calibration image generator controls printing of a horizontal end mark designating an end of a color patch region.

6. An apparatus as in claim 5 wherein said calibration image generator controls printing of a second horizontal dimension mark positioned said first distance from said horizontal end mark.

7. An apparatus as in claim 1 wherein said calibration image generator controls printing of a series of bottom-page registration marks for indicating the bottom of a page of said medium.

8. An apparatus as in claim 1 wherein said medium comprises a plurality of pages and wherein said calibration image generator controls printing of a page-number registration mark for indicating a page number of said medium.

9. An apparatus as in claim 1 wherein said calibration image generator controls a printing mode and wherein said calibration image generator controls printing of a printing-mode registration mark for indicating a printing mode.

10. An apparatus as in claim 1 wherein said calibration image generator controls printing of a vertical start mark designating a start of a color patch region on said medium.

11. An apparatus as in claim 10 wherein said calibration image generator controls printing of a first vertical dimension mark positioned a first distance from said vertical start mark, said first distance equaling a portion of a height of each of said color patches.

12. An apparatus as in claim 11 wherein said calibration image generator controls printing of at least one vertical check mark positioned a fixed distance from said vertical start mark for verifying the authenticity of said vertical start and dimension marks.

13. An apparatus as in claim 11 wherein said calibration image generator controls printing of a vertical end mark designating an end of a color patch region.

14. An apparatus as in claim 13 wherein said calibration image generator controls printing of a second vertical dimension mark positioned said first distance from said vertical end mark.

15. An apparatus as in claim 1 further comprising a printer for printing said plurality of color patches and said registration marks on said medium.

16. An apparatus as in claim 1 further comprising a scanner for scanning said plurality of color patches and said registration marks on said medium.

17. A method for calibrating a color image reproduction system comprising the steps of:
   controlling printing of a plurality of color patches of various colors on a medium and a plurality of registration marks on said medium, said registration marks providing color patch information;
   receiving image data representing said printed registration marks and for interpreting said color patch information;
   receiving image data representing said color patches and for calibrating said color image reproduction system in response thereto; and wherein said step of controlling printing of a plurality of color patches and registration marks includes controlling printing of a start mark designating a start of a color patch region on said medium.

18. A method as in claim 17 wherein said step of controlling printing of a plurality of color patches and registration marks includes controlling printing of a horizontal start mark designating a start of a color patch region on said medium.

19. A method as in claim 18 wherein said step of controlling printing of a plurality of color patches and registration marks includes controlling printing of a first horizontal dimension mark positioned a first distance from said horizontal start mark, said first distance equaling a portion of a width of each of said color patches.

20. A method as in claim 19 wherein said step of controlling printing of a plurality of color patches and registration marks includes controlling printing of at least one horizontal check mark positioned a fixed distance from said horizontal start mark for verifying the authenticity of said horizontal start and dimension marks.

21. A method as in claim 19 wherein said step of controlling printing of a plurality of color patches and registration marks includes controlling printing of a horizontal end mark designating an end of a color patch region.

22. A method as in claim 21 wherein said step of controlling printing of a plurality of color patches and registration marks includes controlling printing of a second horizontal dimension mark positioned said first distance from said, horizontal end mark.

23. A method as in claim 17 wherein said step of controlling printing of a plurality of color patches and registration marks includes controlling printing of a series of bottom-page registration marks for indicating the bottom of a page of said medium.

24. A method as in claim 17 wherein said medium comprises a plurality of pages and wherein said step of controlling printing of a plurality of color patches and registration marks includes controlling printing of a page-number registration mark for indicating a page number of said medium.

25. A method as in claim 17 further comprising a step of controlling a printing mode and wherein said step of controlling printing of a plurality of color patches and registration marks includes controlling printing of a printing-mode registration mark for indicating a printing mode.

26. A method as in claim 17 wherein said step of controlling printing of a plurality of color patches and registration marks includes controlling printing of a vertical start mark designating a start of a color patch region on said medium.

27. A method as in claim 26 wherein said step of controlling printing of a plurality of color patches and registration marks includes controlling printing of a first vertical dimension mark positioned a first distance from said vertical start mark, said first distance equaling a portion of a height of each of said color patches.

28. A method as in claim 27 wherein said step of controlling printing of a plurality of color patches and registration marks includes controlling printing of at least one vertical check mark positioned a fixed distance from said vertical start mark for verifying the authenticity of said vertical start and dimension marks.

29. A method as in claim 27 wherein said step of controlling printing of a plurality of color patches and registration marks includes controlling printing of a vertical end mark designating an end of a color patch region.

30. A method as in claim 29 wherein said step of controlling printing of a plurality of color patches and registration marks includes controlling printing of a second vertical dimension mark positioned said first distance from said vertical end mark.

31. A medium readable by a machine embodying a program of instructions executable by said machine to perform a method for calibrating a color image reproduction system, said calibration method comprising the steps of:
controlling printing of a plurality of color patches of various colors on a print medium and a plurality of registration marks on said print medium, said registration marks providing color patch information;
receiving image data representing said printed registration marks and for interpreting said color patch information;
receiving image data representing said color patches and for calibrating said color image reproduction system in response thereto; and wherein in said calibration method said step of controlling printing of a plurality of color patches and registration marks includes controlling printing of a start mark designating a start of a color patch region on said print medium.

32. A medium as in claim 31 wherein in said calibration method said step of controlling printing of a plurality of color patches and registration marks includes controlling printing of a horizontal start mark designating a start of a color patch region on said medium.

33. A medium as in claim 32 wherein in said calibration method said step of controlling printing of a plurality of color patches and registration marks includes controlling printing of a first horizontal dimension mark positioned a first distance from said horizontal start mark, said first distance equaling a portion of a width of each of said color patches.

34. A medium as in claim 33 wherein in said calibration method said step of controlling printing of a plurality of color patches and registration marks includes controlling printing of at least one horizontal check mark positioned a fixed distance from said horizontal start mark for verifying the authenticity of said horizontal start and dimension marks.

35. A medium as in claim 33 wherein in said calibration method said step of controlling printing of a plurality of color patches and registration marks includes controlling printing of a horizontal end mark designating an end of a color patch region.

36. A medium as in claim 35 wherein in said calibration method said step of controlling printing of a plurality of color patches and registration marks includes controlling printing of a second horizontal dimension mark positioned said first distance from said horizontal end mark.

37. A medium as in claim 31 wherein in said calibration method said step of controlling printing of a plurality of color patches and registration marks includes controlling printing of a series of bottom-page registration marks for indicating the bottom of a page of said medium.

38. A medium as in claim 31 wherein in said calibration method said print medium comprises a plurality of pages and said step of controlling printing of a plurality of color patches and registration marks includes controlling printing of a page-number registration mark for indicating a page number of said print medium.

39. A medium as in claim 31 wherein said calibration method further comprises a step of controlling a printing mode and wherein said step of controlling printing of a plurality of color patches and registration marks includes controlling printing of a printing-mode registration mark for indicating a printing mode.

40. A medium as in claim 31 wherein in said calibration method said step of controlling printing of a plurality of color patches and registration marks includes controlling printing of a vertical start mark designating a start of a color patch region on said medium.

41. A medium as in claim 40 wherein in said calibration method said step of controlling printing of a plurality of color patches and registration marks includes controlling printing of a first vertical dimension mark positioned a first distance from said vertical start mark, said first distance equaling a portion of a height of each of said color patches.

42. A medium as in claim 41 wherein in said calibration method said step of controlling printing of a plurality of color patches and registration marks includes controlling printing of at least one vertical check mark positioned a fixed distance from said vertical start mark for verifying the authenticity of said vertical start and dimension marks.

43. A medium as in claim 41 wherein in said calibration method said step of controlling printing of a plurality of color patches and registration marks includes controlling printing of a vertical end mark designating an end of a color patch region.

44. A medium as in claim 43 wherein in said calibration method said step of controlling printing of a plurality of color patches and registration marks includes controlling printing of a second vertical dimension mark positioned said first distance from said vertical end mark.

45. An apparatus for calibrating a color image reproduction system comprising:

a printer;

a calibration image generator for controlling said printer to print a plurality of color patches of various colors on a medium and a plurality of registration marks on said medium, said registration marks providing color patch information;

an input device for reading said medium and for providing image data representing said color patches and said registration marks;

a registration mark processor for receiving said image data representing said printed registration marks and for interpreting said color patch information;

a calibration unit for receiving said image data representing said color patches and for calibrating said color image reproduction system in response thereto; wherein said calibration image generator controls printing of a start mark designating a start of a color patch region on said medium.

46. An apparatus as in claim 45 wherein said input device is a scanner.

* * * * *